US 6,791,980 B1

(12) United States Patent
Li

(10) Patent No.: US 6,791,980 B1
(45) Date of Patent: Sep. 14, 2004

(54) SYSTEM, DEVICE, AND METHOD FOR REDUCING THE NUMBER OF MULTICAST ROUTES MAINTAINED IN A MULTICAST ROUTING INFORMATION BASE

(75) Inventor: Yunzhou Li, Lowell, MA (US)

(73) Assignee: Nortel Networks Ltd (CA)

( * ) Notice: Subject to any disclaimer, the term of this patent is extended or adjusted under 35 U.S.C. 154(b) by 0 days.

(21) Appl. No.: 09/428,377

(22) Filed: Oct. 28, 1999

(51) Int. Cl.$^7$ ............................................. H04L 12/56
(52) U.S. Cl. ...................................................... 370/390
(58) Field of Search ................................ 370/351, 389, 370/392, 400, 401, 256, 255, 252, 390

(56) References Cited

U.S. PATENT DOCUMENTS 6,009,081 A * 12/1999 Wheeler et al. ............ 370/255
6,353,596 B1 * 3/2002 Grossglauser et al. ...... 370/256
6,392,997 B1 * 5/2002 Chen ........................... 370/252

OTHER PUBLICATIONS

Ballardie et al., Core Based Tree (CBT) An Architecture for Scalable Inter–Domain Multicast Routing, 1993, SIG-COMM, pp. 85–95.*
Farinacci et al, IETF draft–farinacci_msdp_00.txt Multicast Source Discovery Protocol (MSDP) Jun. 25, 1998.
Thaler et al. IETF Internet Draft–ietf–idmr_gum04.txt Border Gateway Multicast Protocol (BGMP) Protocol Spec. Nov. 1998.
Li, Y. IETF Internet Draft draft–ietf–msdp–server–00.txt Group Specific MSDP Peering, Jun. 4, 1999.
European Search Report EP00650104.3 issued Feb. 19, 2004.
Aharoni et al., Restricted Dynamic Steiner Trees for Scalable Multicast in Datagram Networks, Infocom '97, 16$^{th}$ Annual Joint Conference of the IEEE Computer and Comm. Societies. 1997.
Estrin et al., RFC 2362: Protocol Independent Multicast–Sparese Mode (PIM–SM): Protocol Specification IETF, Jun. 1998.
Deering, The PIM Architecture for Wide–Area Multicast Routing, IEEE/ACM Transactions on Networking, IEEE Inc. NY Apr. 1996.
Tian et al., Forwarding State Reduction 1–19 for Sparse Mode Multicast Communication, INFOCOM '98, 17$^{th}$ Annual Joint Conference of the IEEE Computer and Comm. Societies, Mar. 1998.

* cited by examiner

*Primary Examiner*—Douglas Olms
*Assistant Examiner*—Robert W. Wilson
(74) *Attorney, Agent, or Firm*—Steubing McGuinness & Manaras LLP

(57) ABSTRACT

A system, device, and method for reducing the number of multicast routes maintained in a multicast routing information base aggregates a group of multicast routes and installs a single policy route for the group of multicast routes. The policy route is utilized as a default multicast route when no more-specific multicast route is available for one of the aggregated multicast routes. The policy routes are collected and distributed by a bootstrap device, preferably using a special bootstrap message.

45 Claims, 9 Drawing Sheets

SYSTEM, DEVICE, AND METHOD FOR REDUCING THE NUMBER OF MULTICAST ROUTES MAINTAINED IN A MULTICAST ROUTING INFORMATION BASE

FIELD OF THE INVENTION

The present invention relates generally to communication systems, and more particularly to reducing the number of multicast routes maintained by a multicast routing device in a multicast communication network.

BACKGROUND OF THE INVENTION

In today's information age, communication networks are often used for transporting information from an information provider to one or more information consumers.

One technique for transporting information from an information provider to a group of information consumers over the communication network is known as "multicasting." Multicasting allows the information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast address. The multicast clients monitor the communication network fore multicast packets addressed to the multicast group.

In order to distribute multicast packets from a particular multicast source S to the multicast clients for a particular multicast group G, the multicast packet is routed through the communication network by a number of routers. The communication network may include multiple routing domains, and therefore the multicast packet may traverse multiple routing domains. Each router runs various routing protocols to determine, among other things, a "next hop" for each packet based upon address information in the packets. Such routing information is used to establish a multicast distribution tree, and is maintained by each router in one or more routing tables (often referred to as a "routing information base"). In particular, each router maintains a unicast routing information base (URIB) that is used to determine the "next hop" for unicast packets. Also, each multicast router maintains a multicast routing information base (MREB) that is used to determine the "next hop" for multicast packets.

One well-known protocol for routing multicast packets within a multicast routing domain is known as Protocol Independent Multicast (PIM). PIM is so named because it is not dependent upon any particular unicast routing protocol for setting up a multicast distribution tree within the multicast routing domain. PIM has two modes of operation, specifically a sparse mode and a dense mode. PIM Sparse Mode (PIM-SM) is described in the document Internet Engineering Task Force (IETF) Request For Comments (RFC) 2362 entitled *Protocol Independent Multicast— Sparse Mode (PIM-SM): Protocol Specification* and published in June 1998, hereby incorporated by reference in its entirety. PIM Dense Mode (PIM-DM) is described in an Internet Draft of the Internet Engineering Task Force (IETF) entitled *Protocol Independent Multicast Version 2 Dense Mode Specification*, document draft-ietf-pim-v2-dm-03.txt (Jun. 7, 1999), hereby incorporated by reference in its entirety In accordance with the PIM protocol, the various routers within a particular PIM domain establish a default multicast distribution tree, referred to as a "shared tree," for each multicast group. Each shared tree is rooted at a Rendezvous Point (RP) router that acts as the distribution point of all multicast packets for the multicast group. Before a router can join the shared tree for a particular multicast group, the router must learn the identity of the multicast group RP router. A router learns the identity of the multicast group RP router by receiving a PIM Bootstrap Message including a list of all RP routers in the PIM domain. The router receives the PIM Bootstrap Message either from a Bootstrap Router (BSR), which sends the PIM Bootstrap Message to all routers in the PIM domain at predetermined intervals (typically every 60 seconds), or from a neighboring router, which sends the PIM Bootstrap Message to the router if and only if the neighboring router has lost contact with the router for a predetermined period of time (typically 105 seconds). Upon learning the identity of the multicast group RP router, or at any time thereafter, each router that supports a downstream multicast group member (i.e., multicast client) joins the shared tree by sending a PIM Join/Prune Message hop-by-hop toward the multicast group RP router. Each intermediate router that receives the PIM Join/Prune Message from a downstream router also joins the shared tree by forwarding the PIM Join/Prune Message toward the multicast group RP router.

The PIM domain may have a number of source networks that belong to the PIM domain itself. Multicast packets that originate within such intradomain source networks are not routed to other PIM domains. The routes associated with such intradomain source networks (referred to hereinafter as intra-source routes) are distributed by a unicast routing protocol and maintained in the URIB.

In order to route the multicast packet between PIM domains, border routers in each PIM domain (each referred to hereinafter as a Multicast Border Gateway Protocol or MBGP router) determine interdomain routes (referred to hereinafter as MBGP routes) for the (source, group) pair. The MBGP router is typically a Multicast Source Discovery Protocol (MSDP) router or a PIM Multicast Border Router (PMBR) that functions as a Border Gateway Protocol (BGP) router to receive and install MBGP routes. MSDP, PMBR, and BGP are described in IETF documents and are well-known in the art.

A multicast communication network may have a large number of multicast routes. Within a particular multicast router, the number of multicast routes affects the size of the MRIB (i.e., the amount of memory consumed by the MRIB), which in turn affects the time required to search the MREB for a particular multicast route. The number of multicast routes also affects the inter-router communication overhead required to distribute multicast routes among the various routers.

Thus, a need has remained for a technique that reduces the number of multicast routes maintained in the MRIB.

SUMMARY OF THE INVENTION

In accordance with one aspect of the invention, a single policy route is installed in the MRIB in place of multiple multicast routes. The policy route may be an aggregation of multicast routes that do not have a next hop device, or the policy route may be an aggregation of multicast routes for which the next hop device can be determined from the corresponding unicast routes. The policy route includes an indicator indicating whether the policy route is an aggregation of multicast routes that do not have a next hop device, in which case the policy route is designated a rejected policy route, or an aggregation of multicast routes for which the next hop device can be determined from the corresponding unicast routes, in which case the policy route is designated an accepted policy route.

In accordance with another aspect of the invention, a bootstrap router (BSR) collects policy routes and distributes the policy routes using a bootstrap message. In a preferred embodiment, the BSR router periodically sends a bootstrap message including all policy routes, and also sends a bootstrap message including only changed policy routes whenever the BSR router detects a policy route change. The bootstrap messages are propagated to all PIM routers in the PIM domain.

In accordance with another aspect of the invention, a router that receives a bootstrap message installs the policy routes in its MRIB.

In accordance with another aspect of the invention, the router finds the best, most-specific multicast route in the MREB for a source address, and uses the corresponding unicast route to determine the next hop device for the source address if the most-specific multicast route is an accepted policy route.

In accordance with another aspect of the invention, the router finds the best, mostspecific multicast route in the MRIB for a source address, and determines that there is no next hop device for the source address if the most-specific multicast route is a rejected policy route.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
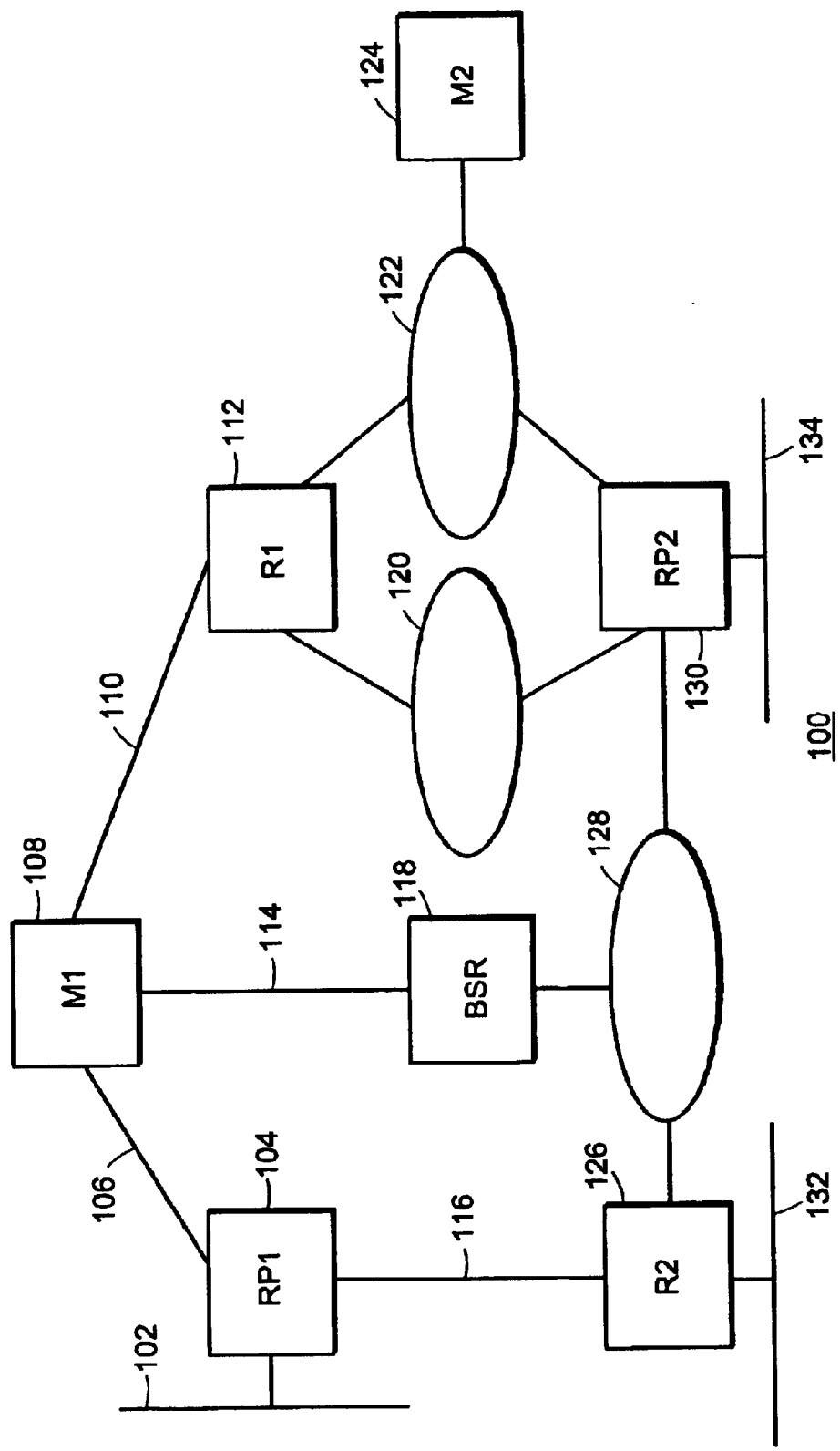
FIG. 1 is a block diagram showing an exemplary multicast communication network in accordance with an embodiment of the present invention.

An embodiment of the present invention reduces the number of multicast routes maintained in the MRIB by installing a single multicast route (referred to hereinafter as a policy route) in the MRIB in place of multiple multicast routes. A policy route is a special multicast route (protocol type=POLICY). Unlike other types of routes, a policy route has no next hop or metric cost associated with it.

The policy route is essentially an aggregation of a group of multicast routes. In a preferred embodiment of the invention, the policy route is an aggregation of all multicast routes that fall within a predetermined source address range that is defined by a source address S and a prefix (denoted hereinafter as S/prefix). The prefix determines the number of significant source address bits for matching the policy route. The policy route is used as a default multicast route for any one of the aggregated multicast routes when there is no more-specific multicast route for the aggregated multicast route in the MRIB.

A policy route can be used to aggregate a group of multicast routes that can be routed according to their corresponding unicast routes. Such a policy route is designated an "accepted" policy route.

A policy route can also be used to aggregate a group of multicast routes that will not be forwarded by the router. Such a policy route is designated a "rejected" policy route.

In a preferred embodiment of the invention, each router installs a default policy route (0.0.0.0/0) designated as an "accepted" policy route. The default policy route a matches all multicast routes, and enables multicast packets to be forwarded according to the corresponding unicast route when there is no more-specific multicast route in the MREB. Other policy routes may also be installed.

As with other types of multicast routes, the policy routes are distributed to all routers in the domain. A preferred embodiment utilizes a single router (referred to hereinafter as a bootstrap router or BSR) to collect and distribute the policy routes. Specifically, BSR installs a default policy route, and is configured with other policy routes. The BSR distributes the policy routes to the other routers in the domain, preferably utilizing a Policy Bootstrap message including policy routes. In a preferred embodiment, the BSR periodically sends a Policy Bootstrap message including all policy routes, and may also send a Policy Bootstrap message including only changed policy routes whenever one or more policy routes change. The Policy Bootstrap message is similar to the Protocol Independent Multicast (PIM) Bootstrap message that is used for propagating Rendezvous Point (RP) information to PIM routers in a PIM domain, but carries policy routes instead. The Policy Bootstrap message includes a Change indicator (described in detail below) indicating whether the Policy Bootstrap message contains all policy routes or just changed policy routes. The BSR sends the Policy Bootstrap messages to each of its neighboring routers. Each router in turn sends the Policy Bootstrap message to each of its neighboring routers, so that the Policy Bootstrap messages are propagated to all routers in the domain.

Each router that receives a Policy Bootstrap message installs the appropriate policy route(s) in its MRIB. If the Policy Bootstrap message includes all policy routes, then the router installs any new policy routes, modifies any changed policy routes, and removes any obsolete policy routes (i.e., any policy routes not included in the Policy Bootstrap message). If the Policy Bootstrap message includes only changed policy route(s), then the router modifies the changed policy route(s).

After installing the policy route(s), the router can then determine a next hop router for a particular source address A. The router may need to determine the next hop router for A, for example, as part of a PIM reverse path forwarding check or for forwarding a multicast packet for A. In order to determine the next hop router for A, the router searches the MRIB for the most-specific multicast route for A, and determines whether the mostspecific multicast route is a policy route. If the most-specific multicast route is not a policy route, then the router determines the next hop router according to the multicast route. If the most-specific multicast route is a policy route, then the router determines whether the policy route is designated as accepted or rejected. If the policy route is designated as accepted, then the router proceeds to find a unicast route for A in the URIB, and determines the next hop router according to the unicast route. If the policy route is designated as rejected, then there is no next hop router for A.

FIG. 1 shows an exemplary multicast communication network 100. The exemplary multicast communication network 100 includes a number of interconnected routers. Specifically, the exemplary PIM network 100 includes a Bootstrap Router BSR (118), two MBGP routers M1 (108) and M2 (124), two RP routers RP1 (104) and RP2 (130), and two other routers R1 (112) and R2 (126).

The MBGP router M1 (108) is coupled to the RP router RP1 (104) via network 106. The MBGP router M1 (108) is coupled to the router R1 (112) via network 110. The MBGP router M1 (108) is coupled to the Bootstrap Router BSR (118) via network 114.

The RP router RP1 (104) supports a directly connected network 102. The RP router RP1 (104) is coupled to the MBGP router M1 (108) via the network 106. The RP router RP1 (104) is coupled to the router R2 (126) via a network 116.

The router R2 (126) supports a directly connected network 132. The router R2 (126) is coupled to the RP router RP1 (104) via the network 116. The router R2 (126) is coupled to both the Bootstrap Router BSR (118) and the RP router RP2 (130) via a network 128.

The Bootstrap Router BSR (118) is coupled to the MBGP router M1 (108) via the network 114. The Bootstrap Router BSR (118) is coupled to both the router R2 (126) and the RP router RP2 (130) via the network 128. The Bootstrap Router BSR (118) is coupled to both the router R1 (112) and the RP router RP2 (130) via a network 120.

The router R1 (112) is coupled to the MBGP router M1 (108) via the network 110. The router R1 (112) is coupled to both the Bootstrap Router BSR (118) and the RP router RP2 (130) via the network 120. The router R1 (112) is coupled to both the MBGP router M2 (124) and the RP router RP2 (130) via a network 122.

The RP router RP2 supports a directly connected network 134. The RP router RP2 (130) is coupled to both the router R2 (126) and the Bootstrap Router BSR (118) via the network 128. The RP router RP2 (130) is coupled to both the Bootstrap Router BSR (118) and the router R1 (112) via the network 120. The RP router RP2 (130) is coupled to both the MBGP router M2 (124) and the router R1 (112) via the network 122.

The MBGP router M2 (124) is coupled to both the router R1 (112) and the RP router RP2 (130) via the network 122.

The BSR installs a default policy route, and is configured with other policy routes. The BSR distributes the policy routes to the other routers in the domain, preferably utilizing a Policy Bootstrap message including policy routes. In a preferred embodiment, the BSR periodically sends a Policy Bootstrap message including all policy routes, and may also send a Policy Bootstrap message including only changed policy routes whenever one or more policy routes change. The BSR sends the Policy Bootstrap messages to each of its neighboring routers.

Figure 5:
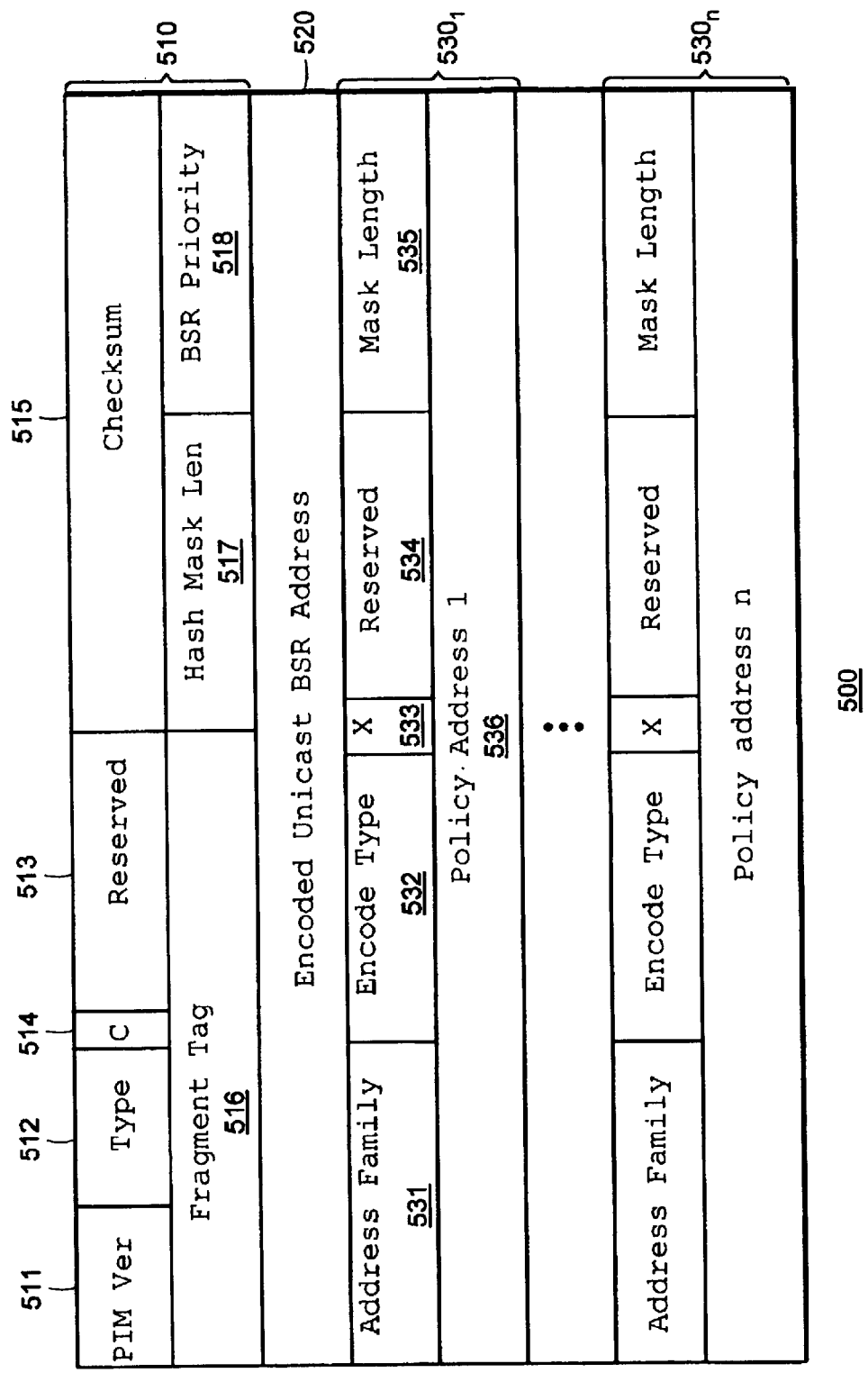
FIG. 5 is a block diagram showing the format of a Policy Bootstrap message in accordance with an embodiment of the present invention.

FIG. 5 is a block diagram showing the format of a preferred Policy Bootstrap message 500. The preferred Policy Bootstrap message 500 includes a PIM message header 510, a BSR address 520, and a number of policy routes $530_1$ through $530_n$. The PIM message header 510 includes a PIM Version field 511, a Type field 512, a Reserved field 513, a Change field 514, a Checksum field 515, a Fragment Tag field 516, a Hash Mask Length field 517, and a BSR Priority field 518. Except for the Change field 514, the fields in the PIM message header 510 are identical to the corresponding fields in a PIM Bootstrap message. The Change field 514 is used to indicate whether the MBGP Bootstrap message 500, and particularly the policy routes represented by the policy route blocks $530_1$ through $530_n$, includes only changed policy routes.

The BSR Address 520 includes the address of the BSR.

Each policy route block 530 includes an Address Family field 531, an Encode Type field 532, an Accepted/Rejected indicator (X) 533, a Reserved field 534, a Mask Length field 535, and a Policy Address field 536. The Address Family field 531 indicates the address type for the policy address in the Policy Address field 536 (e.g., EP, IPv6, IPX). The Encode Type field 532 indicates an address encoding for the policy address in the Policy Address field 536. The Accepted/Rejected indicator (X) 533 indicates whether the policy address in the Policy Address field 536 is accepted or rejected. The Mask Length field 535 indicates the number of significant address bits (i.e., the prefix) associated with the policy address in the Policy Address field 536. The Policy Address 536 contains the policy address.

Figure 2:
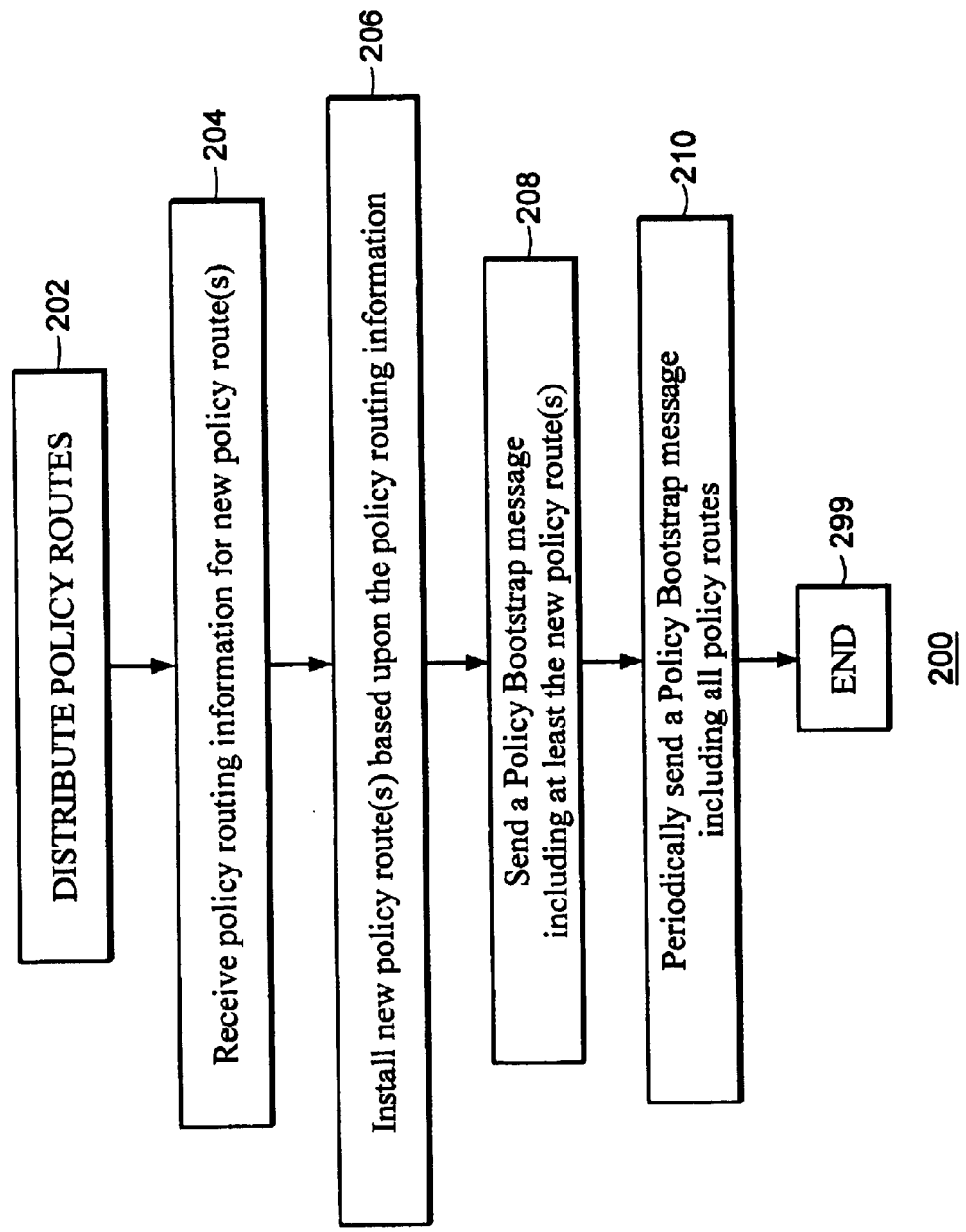
FIG. 2 is a logic flow diagram showing exemplary logic for distributing policy routes in accordance with an embodiment of the present invention.

FIG. 2 is a logic flow diagram showing exemplary logic 200 for distributing policy routes by the BSR 118. Beginning at step 202, and upon receiving policy information for new policy route(s), in step 204, the logic installs new policy route(s) based upon the policy routing information, in step 206. The logic sends a Policy Bootstrap message including at least the new policy route(s), in step 208. The logic periodically sends a Policy Bootstrap message including all policy routes, in step 210. The logic 200 terminates in step 299.

Figure 3:
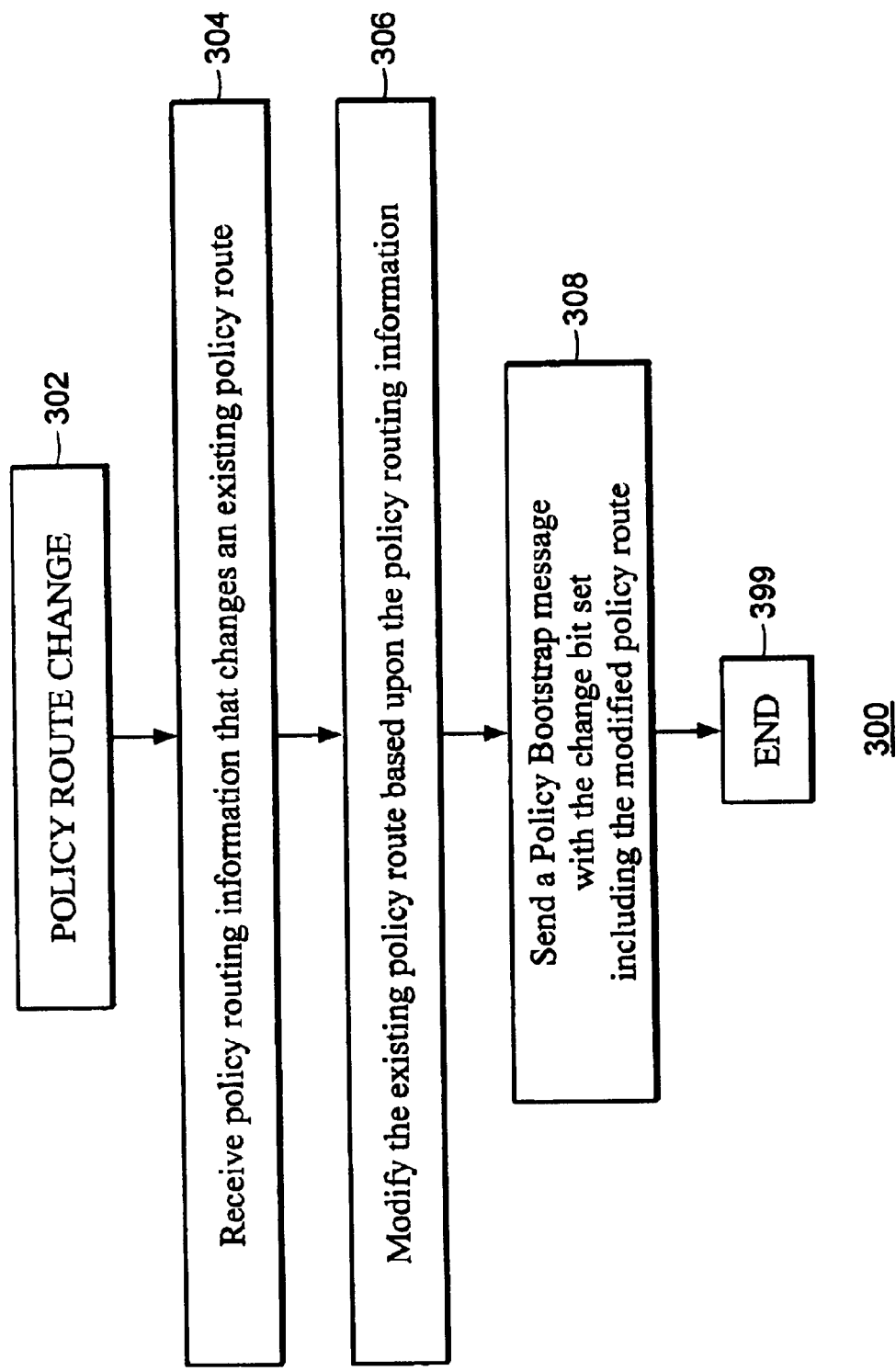
FIG. 3 is a logic flow diagram showing exemplary logic for distributing changed policy routes in accordance with an embodiment of the present invention.

FIG. 3 is a logic flow diagram showing exemplary logic 300 for distributing changed policy routes by the BSR 118. Beginning at step 302, and upon receiving policy information that changes an existing policy route, in step 304, the logic modifies the existing policy route based upon the policy routing information, in step 306. The logic sends a Policy Bootstrap message with the Change bit set and including the modified policy route, in step 308. The logic 300 terminates in step 399.

Each router that receives a Policy Bootstrap message installs the appropriate policy route(s) in its MRIB. If the Policy Bootstrap message includes all policy routes, then the router installs any new policy routes, modifies any changed policy routes, and removes any obsolete policy routes (i.e., any policy routes not included in the Policy Bootstrap message). If the Policy Bootstrap message includes only changed policy route(s), then the router modifies the changed policy route(s).

Figure 4:
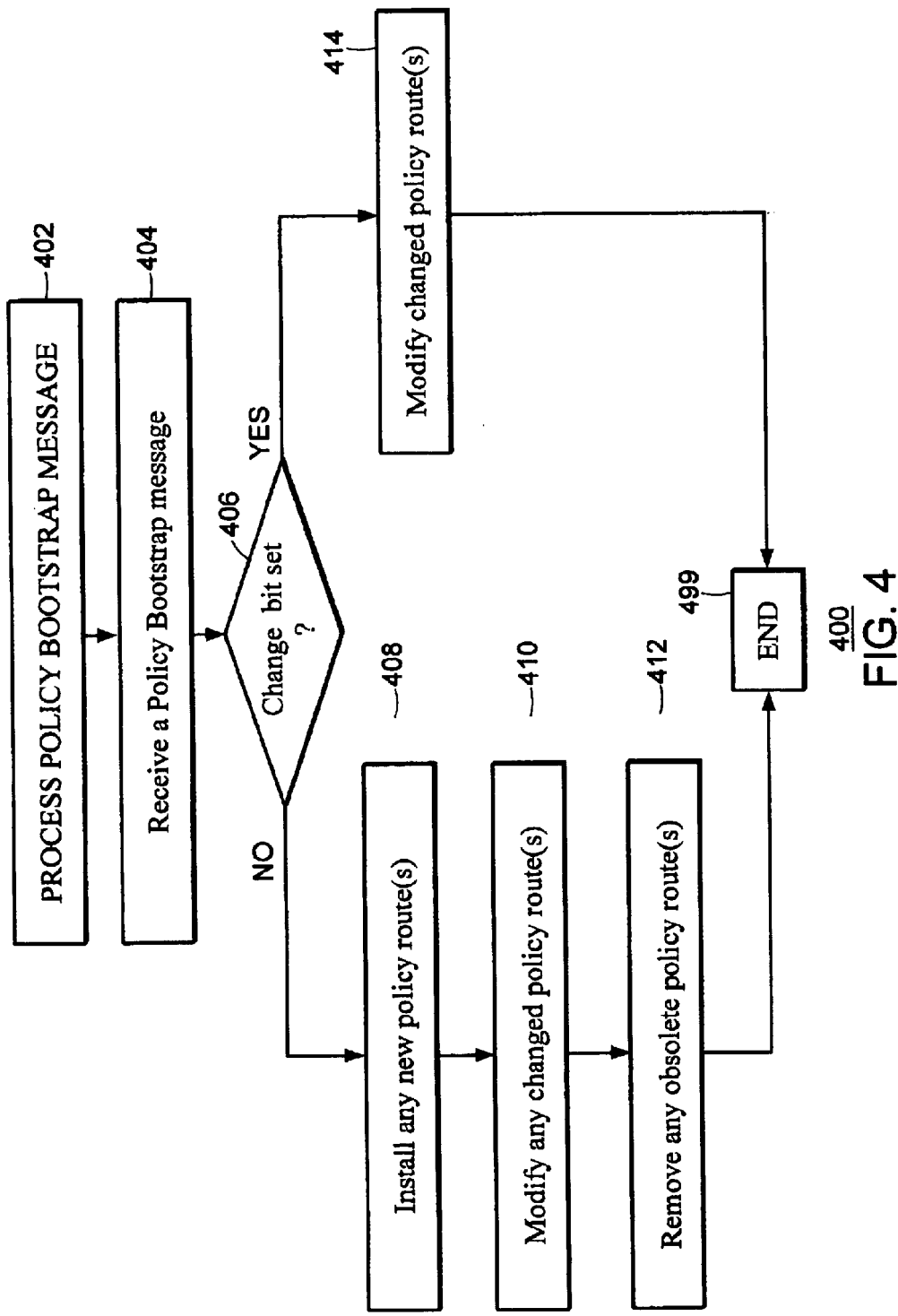
FIG. 4 is a logic flow diagram showing exemplary logic for processing a Policy Bootstrap message by a multicast router in accordance with an embodiment of the present invention.

FIG. 4 is a logic flow diagram showing exemplary logic 400 for processing a Policy Bootstrap message by a multicast router. Beginning at step 402, and upon receiving a Policy Bootstrap message 404, the logic determines whether the Change bit 514 is set to indicate that the Policy Bootstrap message includes only changed policy routes, in step 406. If the Change bit 514 is not set to indicate that the Policy Bootstrap message includes only changed policy routes (NO in step 406), then the Policy Bootstrap message includes all policy routes, in which case the logic installs any new policy route(s), in step 408, modifies any changed policy route(s), in step 410, and removes any obsolete policy route(s), in step 412. If the Change bit 514 is set to indicate that the Policy Bootstrap message includes only changed policy routes (YES in step 406), then the logic modifies the changed policy route(s), in step 414. The logic 400 terminates in step 499.

A PIM router is required to perform a Reverse Path Forwarding (RPF) check whenever it sends a PIM Join/Prune message towards a RP router or a multicast source, and is also required to perform a RPF check when it receives a multicast packet from a RP router or a multicast source.

Figure 6:
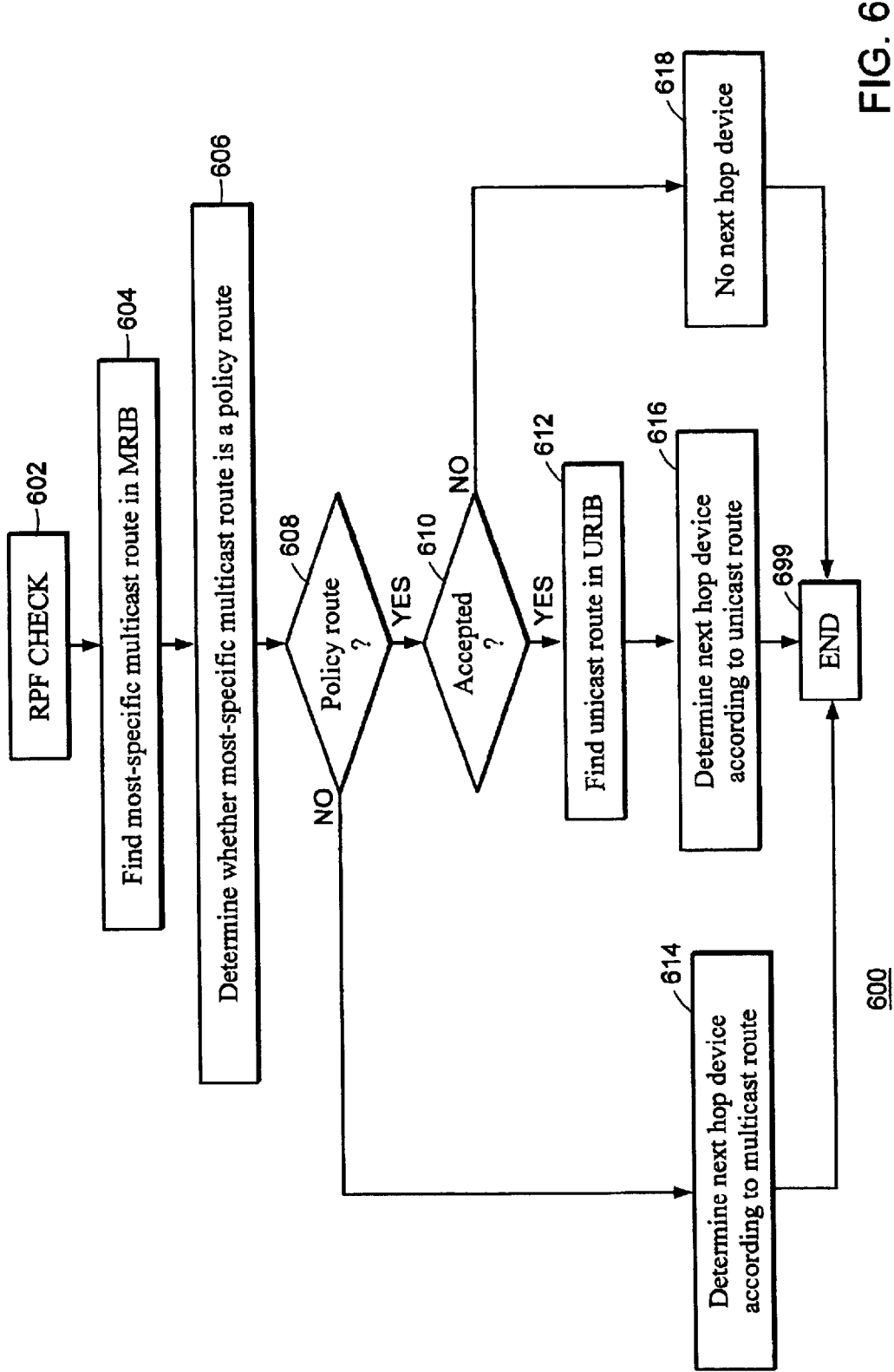
FIG. 6 is a logic flow diagram showing exemplary logic for performing a reverse path forwarding check in accordance with an embodiment of the present invention.

FIG. 6 is a logic flow diagram showing exemplary logic 600 for performing a reverse path forwarding check. Beginning at step 602, the logic proceeds to find the mostspecific multicast route in the MRIB, in step 604. The logic then determines whether the multicast route is a policy route, in step 606. If the multicast route is not a policy route (NO in step 608), then the logic determines the next hop device according to the multicast route, in step 614. If the multicast route is a policy route (YES in step 608), then the logic determines whether the policy route is designated as accepted or rejected, in step 610. If the policy route is designated as accepted (YES in step 610), then the logic proceeds to find the appropriate unicast route in the URIB, in step 612, and determine the next hop device according to the unicast route, in step 616. If the policy route is designated as rejected (NO in step 610), then there is no next hop device (618). The logic 600 terminates in step 699.

Figure 7:
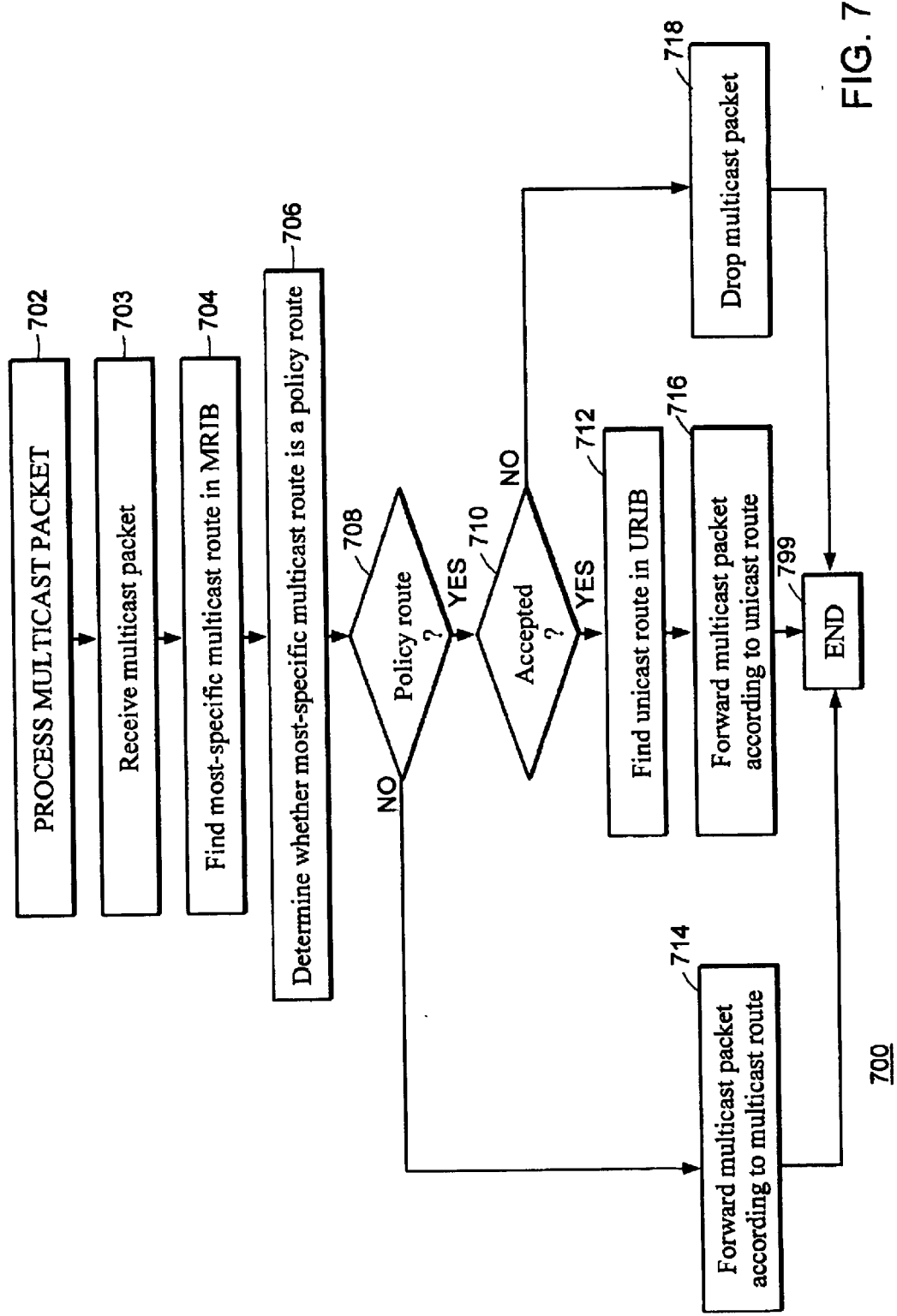
FIG. 7 is a logic flow diagram showing exemplary logic for processing a multicast packet in accordance with an embodiment of the present invention.

FIG. 7 is a logic flow diagram showing exemplary logic 700 for processing a multicast packet. Beginning at step 702, and upon receiving a multicast packet, in step 703, the logic proceeds to find the most-specific multicast route in the MRIB, in step 704. The logic then determines whether the multicast route is a policy route, in step 706. If the multicast route is not a policy route (NO in step 708), then the logic forwards the multicast packet according to the multicast route, in step 714. If the multicast route is a policy route (YES in step 708), then the logic determines whether the policy route is designated as accepted or rejected, in step 710. If the policy route is designated as accepted (YES in step 710), then the logic proceeds to find the appropriate unicast route in the URIB, in step 712, and forwards the multicast packet according to the unicast route, in step 716. If the policy route is designated as rejected (NO in step 710), then the logic drops the multicast packet without forwarding the multicast packet, in step 718. The logic 700 terminates in step 799.

Figure 8:
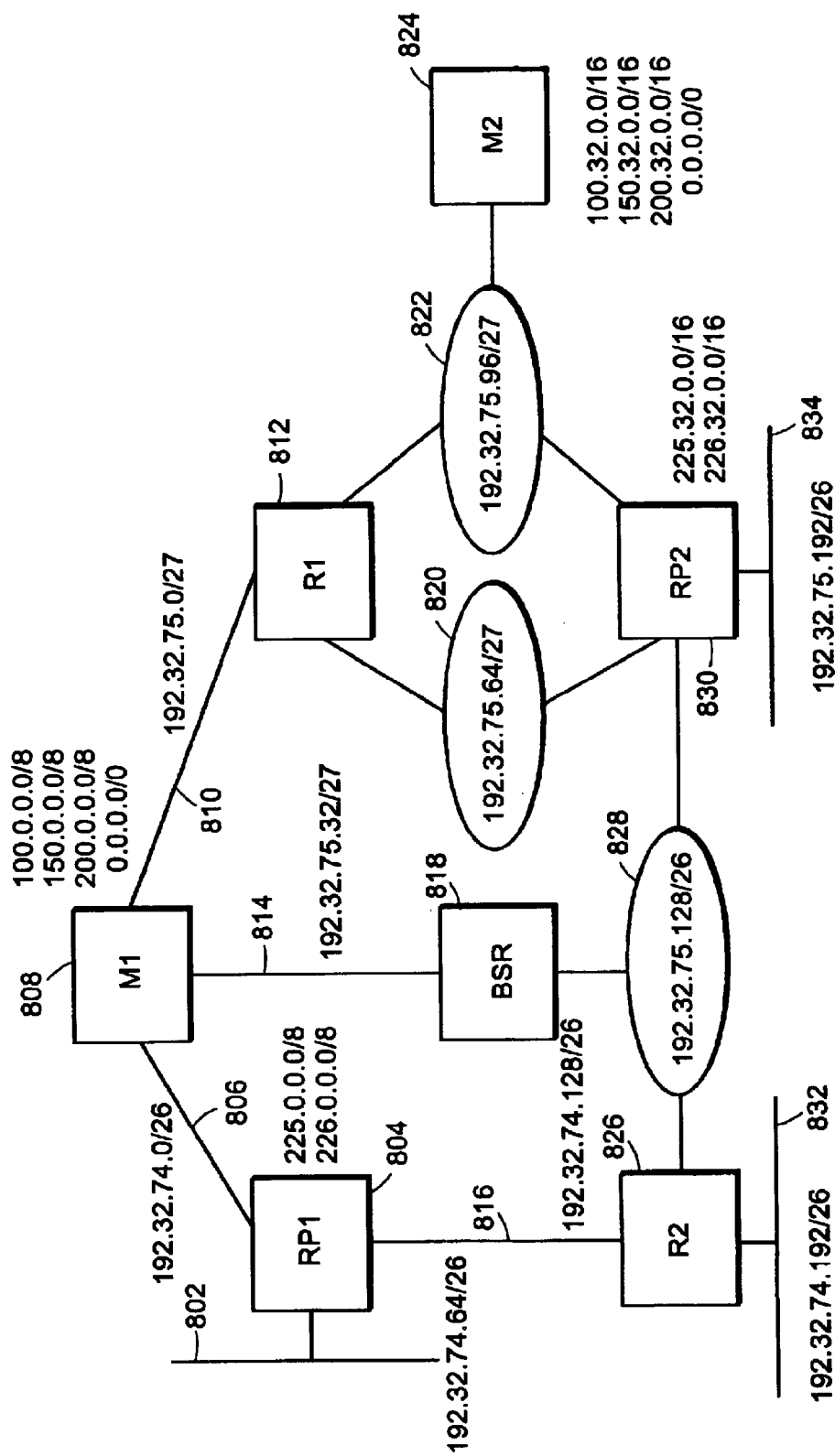
FIG. 8 is a block diagram showing an exemplary multicast communication network in accordance with an embodiment of the present invention.

Various elements of the present invention can be demonstrated by example. FIG. 8 shows an exemplary PIM network 800. The exemplary PIM network 800 includes a number of interconnected routers. Specifically, the exemplary PIM network 800 includes a Bootstrap Router BSR (818), two MBGP routers M1 (808) and M2 (824), two RP routers RP1 (804) and RP2 (830), and two other routers R1 (812) and R2 (826). In the discussion that follows, networks and routes are identified by a source address and a mask, and are shown in the form X.X.X.X/Y, where X.X.X.X is the source address and Y is a prefix indicating the mask length (in bits). Also in the discussion that follows, the MBGP router M2 (824) has a higher priority than the MBGP router M1 (808), and the RP router RP2 (830) has a higher priority than the RP router RP1 (804).

The MBGP router M1 (808) has four (4) MBGP routes, specifically 100.0.0.0/8, 150.0.0.0/8, 200.0.0.0/8, and a default MBGP route 0.0.0.0/0. The MBGP router M1 (808) is coupled to the RP router RP1 (804) via network 192.32.74.0/26 (806). The MBGP router M1 (808) is coupled to the router R1 (812) via network 192.32.75.0/27 (810). The MBGP router M1 (808) is coupled to the Bootstrap Router BSR (818) via network 192.32.75.32/27 (814).

The RP router RP1 (804) is responsible for two group routes, specifically group routes 225.0.0.0/8 and 226.0.0.0/8. The RP router RP1 (804) supports a directly connected network 192.32.74.64/26 (802). The RP router RP1 (804) is coupled to the MBGP router M1 (808) via the network 192.32.74.0/26 (806). The RP router RP1 (804) is coupled to the router R2 (826) via a network 192.32.74.128/26 (816).

The router R2 (826) supports a directly connected network 192.32.74.192/26 (832). The router R2 (826) is coupled to the RP router RP1 (804) via the network 192.32.74.128/26 (816). The router R2 (826) is coupled to both the Bootstrap Router BSR (818) and the RP router RP2 (830) via a network 192.32.75.128/26 (828).

The Bootstrap Router BSR (818) is coupled to the MBGP router M1 (808) via the network 192.32.75.32/27 (814). The Bootstrap Router BSR (818) is coupled to both the router R2 (826) and the RP router RP2 (830) via the network 192.32.75.128/26 (828). The Bootstrap Router BSR (818) is coupled to both the router R1 (812) and the RP router RP2 (830) via a network 192.32.75.64/27 (820).

The router R1 (812) is coupled to the MBGP router M1 (808) via the network 192.32.75.0/27 (810). The router R1 (812) is coupled to both the Bootstrap Router BSR (818) and the RP router RP2 (830) via the network 192.32.75.64/27 (820). The router R1 (812) is coupled to both the MBGP router M2 (824) and the RP router RP2 (830) via a network 192.32.75.96/27 (822).

The RP router RP2 (830) is responsible for two group routes, specifically group routes 225.32.0.0/16 and 225.32.0.0/16. The group routes 225.32.0.0/16 and 226.32.0.0/16 associated with the RP router RP2 (830) are more specific than the group routes 225.0.0.0/8 and 226.0.0.0/8 associated with the RP router RP1 (804). The RP router RP2 supports a directly connected network 192.32.75.192/26 (834). The RP router RP2 (830) is coupled to both the router R2 (826) and the Bootstrap Router BSR (818) via the network 192.32.75.128/26 (828). The RP router RP2 (830) is coupled to both the Bootstrap Router BSR (818) and the router R1 (812) via the network 192.32.75.64/27 (820). The RP router RP2 (830) is coupled to both the MBGP router M2 (824) and the router R1 (812) via the network 192.32.75.96/27 (822).

The MBGP router M2 (824) has four (4) MBGP routes, specifically 100.32.0.0/16, 150.32.0.0/16, 200.32.0.0/16, and a default MBGP route 0.0.0.0/0. The MBGP routes 100.32.0.0/16, 150.32.0.0/16, 200.32.0.0/16 associated with the MBGP router M2 (824) are more specific than the corresponding MBGP routes 100.0.0.0/8, 150.0.0.0/8, 200.0.0.0/8 associated with the MBGP router M1 (808). The MBGP router M2 (824) is coupled to both the router R1 (812) and the RP router RP2 (830) via the network 192.32.75.96/27 (822).

The MBGP routes and group routes are distributed to all PIM routers. Additionally, the BSR 818 installs a default policy entry (0.0.0.0/0) designated as an accepted policy route, and is configured with a policy entry (160.0.0.0/8)

designated as a rejected policy route. The BSR 818 distributes the default policy entry (0.0.0.0/0) and the policy entry (160.0.0.0/8) to all PIM routers in the domain using Policy Bootstrap messages. As a result, each PIM router in the domain installs the appropriate MBGP routes, group routes, and policy routes in its MRIB.

Figure 9:
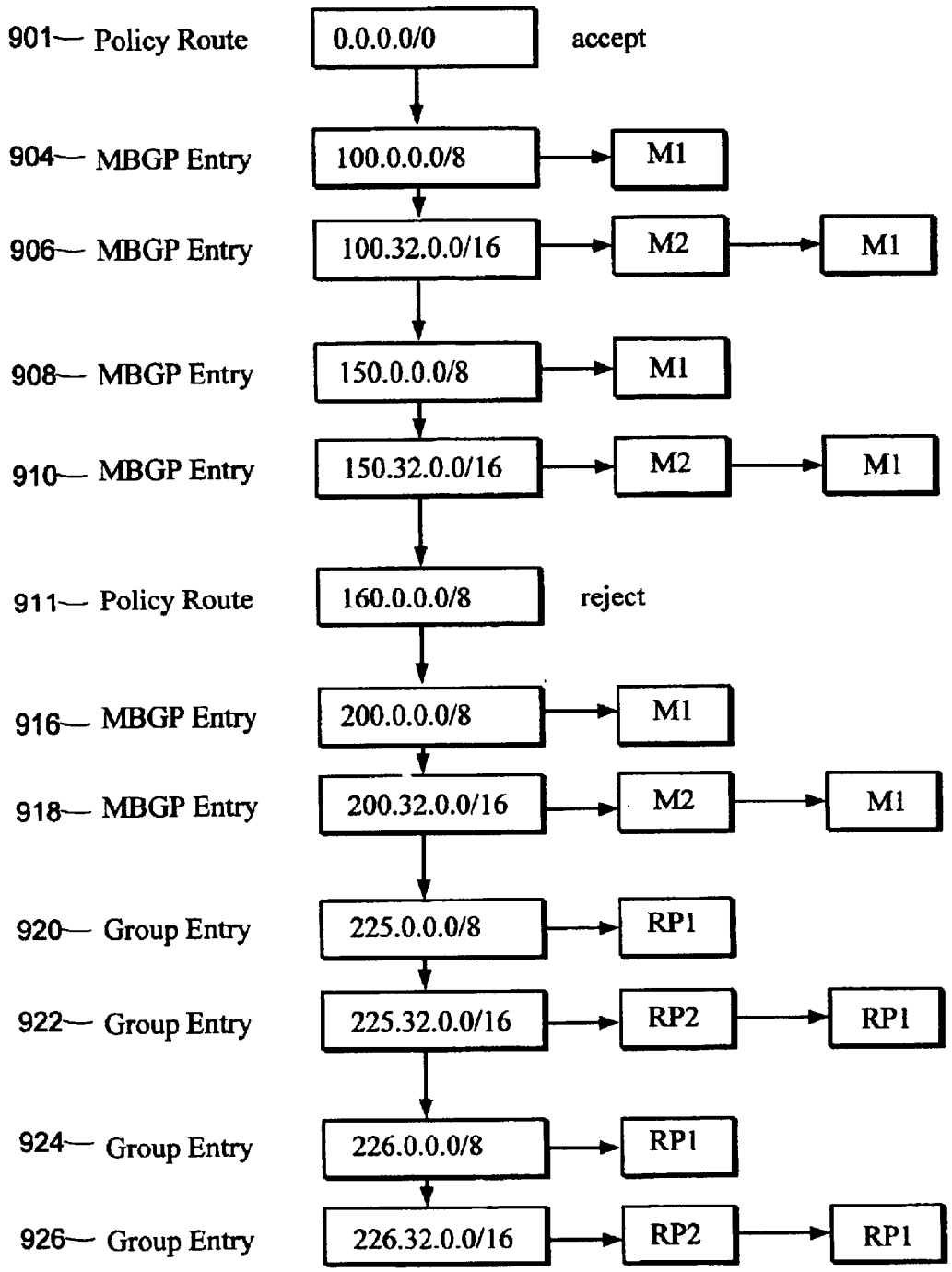
FIG. 9 is a block diagram showing an exemplary multicast routing information base in accordance with an embodiment of the present invention.

FIG. 9 is a block diagram showing an exemplary MREB 900 maintained by all PIM routers in the domain. The MRIB includes the MBGP entries (904, 906, 908, 910, 916, 918), group entries (920, 922, 924, 926), a default policy route 901 designated as an accepted policy route, and a policy route 911 designated as a rejected policy route. It should be noted that all possible source addresses fall within the source address range of the default policy route 901, although each of the other MRIB entries represents a more-specific multicast route that takes precedence over the default policy route 901 for any source address that falls within its source address range.

Thus, in order to determine the next hop device for a particular source address, the router first finds the most-specific multicast route for the source address in the MRIB. If the most-specific multicast route for the source address is one of the MBGP routes (904, 906, 908, 910, 916, 918) or one of the group routes (920, 922, 924, 926), then the next hop device for that source address is determined according to the MBGP route or group route. If the most-specific multicast route for the source address is the policy route 911, then there is no next hop device associated with that source address, and any packets received from that source address are dropped. If the most-specific multicast route for the source address is the default policy route 901, then the router finds the appropriate unicast entry in the URIB, and determines the next hop device according to the unicast route.

In a preferred embodiment of the present invention, predominantly all of the logic for installing, maintaining, distributing, and utilizing policy routes is implemented as a set of computer program instructions that are stored in a computer readable medium and executed by an embedded microprocessor system within a router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

I claim:

1. A method for reducing the number of multicast routes maintained by a multicast device in a multicast communication network, the method comprising:

receiving policy routing information relating to a plurality of multicast routes, the policy routing information providing default routing information for each of the plurality of multicast routes when no more-specific routing information is available; and maintaining a single policy route in place of the plurality of multicast routes, the policy route reflecting the policy routing information, and wherein said plurality of multicast routes are associated with respective source addresses, wherein said source addresses fall within a predetermined range of source address values distributing the policy route to at least one other multicast device in the multicast communication network; and wherein distributing the policy route to the at least one other multicast device in the multicast communication network comprises sending at least one bootstrap message including at least the policy route.

2. The method of claim 1, wherein the plurality of multicast routes are multicast routes that are not associated with a next hop device.

3. The method of claim 1, wherein the plurality of multicast routes are multicast routes for which a next hop device can be determined from corresponding unicast routes.

4. The method of claim 1, wherein the predetermined range of source address values is defined by a predetermined source address, and a prefix indicating a number of most-significant source address bits, the source address and the prefix together defining a string of bit values to be matched between said predetermined source address and said respective source addresses for said plurality of multicast routes.

5. The method of claim 1, further comprising:

finding a next hop device for a source address.

6. The method of claim 5, wherein finding the next hop device for the source address comprises:

finding a most-specific multicast route for the source address;

determining that said most-specific multicast route is a policy route;

finding a unicast route for the source address; and determining the next hop device according to the unicast route.

7. The method of claim 5, wherein finding the next hop device for the source address comprises:

finding a most-specific multicast route for the source address;

determining that said most-specific multicast route is a policy route; and determining that there is no next hop device for the source address.

8. The method of claim 1, further comprising:

receiving a multicast packet having a source address;

finding a most-specific multicast route for the same address;

determining that said most-specific multicast route is a policy route;

finding a unicast route for the source address; and forwarding the multicast packet according to the unicast route.

9. The method of claim 1, further comprising:

receiving a multicast packet having a source address;

finding a most-specific multicast route for the source address;

determining that said most-specific multicast route is a policy route; and dropping the multicast packet.

10. A method for reducing the number of multicast routes maintained by a multicast device in a multicast communication network the method comprising:

receiving policy routing information relating to a plurality of multicast routes, the policy routing information providing default routing information for each of the plurality of multicast routes when no more-specific routing information is available;

maintaining a single policy route in place of the plurality of multicast routes, the policy route reflecting the policy routing information;

distributing the policy route to at least one other multicast device in the multicast communication network; and wherein distributing the policy route to the at least one other multicast device in the multicast communication network comprises sending a bootstrap message including at least the policy route.

11. The method of claim 10, wherein the bootstrap message comprises:

a source address; and a prefix including a number of most-significant source address bits, the source address and the prefix together defining a source address range encompassing the plurality of multicast routes.

12. The method of claim 11, wherein the bootstrap message further comprises:

an indicator indicating whether the plurality of multicast routes are multicast routes that are not associated with a next hop device or multicast routes for which the next hop device can be determined from corresponding unicast routes.

13. A method for reducing the number of multicast routes maintained by a multicast device in a multicast communication network, the method comprising:

receiving policy routing information relating to a plurality of multicast routes, the policy routing information providing default routing information for each of the plurality of multicast routes when no more-specific routing information is available;

maintaining a single policy route in place of the plurality of multicast routes, the policy route reflecting the policy routing information;

wherein the policy route comprises a source address and a prefix indicating a number of most-significant source address bits, the source address and the prefix together defining a source address range encompassing the plurality of multicast routes; and wherein the policy route further comprises an indicator indicating whether the plurality of multicast routes are multicast routes that are not associated with a next hop device or multicast routes for which the next hop device can be determined from corresponding unicast routes.

14. A method for reducing the number of multicast routes maintained by a multicast device in a multicast communication network, the method comprising:

receiving policy routing information relating to a plurality of multicast routes, the policy routing information providing default routing information for each of the plurality of multicast routes when no more-specific routing information is available;

maintaining a single policy route in place of the plurality of multicast routes, the policy route reflecting the policy routing information; and wherein receiving the policy routing information comprises receiving, a bootstrap message including the policy routing information.

15. A device comprising:

a multicast routing information base;

receiving logic operably coupled to receive policy routing information relating to a plurality of multicast routes, the policy routing information providing default routing information for each of the plurality of multicast routes when no more-specific routing information is available; and route maintenance logic operably coupled to maintain in the multicast routing information base a single policy route in place of the plurality of multicast routes, the policy route reflecting the policy routing information, and wherein said plurality of multicast routes are associated with respective source addresses, wherein said source addresses fall within a predetermined range of source address values.

16. The device of claim 15, wherein the plurality of multicast routes are multicast routes that are not associated with a next hop device distribution logic operable to distribute the policy route to at least one other multicast device in a multicast communication network; and wherein said distribution logic is operable to distribute the policy to the at least one other multicast device in the multicast communication network by sending at least one bootstrap message including at least the policy route.

17. The device of claim 15, wherein the plurality of multicast routes are multicast routes for which a next hop device can be determined from corresponding unicast routes.

18. The device of claim 15, wherein the predetermined range of source address values is defined by a source address and a prefix indicating a number of most-significant source address bits, the source address and the prefix together defining a string of bit values to be matched between said predetermined source address and said respective source addresses for said plurality of multicast routes.

19. The device of claim 15, further comprising:

reverse path forwarding logic operably coupled to determine a next hop device for a source address.

20. The device of claim 19, wherein the reverse path forwarding logic is operably coupled to find a most-specific multicast route for the source address, determine that said most-specific multicast route is a policy route, find a unicast route for the source address, and determine the next hop device according to the unicast route.

21. The device of claim 19, wherein the reverse path forwarding logic is operably coupled to find a most-specific multicast route for the source address, determine that said most-specific multicast route is a policy route, and determine that there is no next hop device for the source address.

22. The device of claim 15, further comprising forwarding logic operably coupled to receive a multicast packet having a source address, find a most-specific multicast route for the source address, determine that said most-specific multicast route is a policy route, find a unicast route for the source address, and forward the multicast packet according to the unicast route.

23. The device of claim 15, further comprising forwarding logic operably coupled to receive a multicast packet having a source address, find a most-specific multicast route for the source address, determine that said most-specific multicast route is a policy route, and drop the multicast packet.

24. A device comprising:
a multicast routing information base;
receiving logic operably coupled to receive policy routing information relating to a plurality of multicast routes, the policy routing information providing default routing information for each of the plurality of multicast routes when no more-specific routing information is available;
route maintenance logic operably coupled to maintain in the multicast routing information base a single policy route in place of the plurality of multicast routes the policy route reflecting the policy routing information;
route distribution logic operably coupled to distribute the policy route to at least one other multicast device in the multicast communication network; and
wherein the route distribution logic is operably coupled to send a bootstrap message including at least the policy route.

25. The device of claim 24, wherein the bootstrap message comprises:
a source address; and
a prefix indicating a number of most-significant source address bits, the source address and the prefix together defining a source address range encompassing the plurality of multicast routes.

26. The device of claim 25, wherein the bootstrap message further comprises:
an indicator indicating whether the plurality of multicast routes are multicast routes that are not associated with a next hop device or multicast routes for which the next hop device can be determined from corresponding unicast routes.

27. A device comprising:
a multicast routing information base;
receiving logic operably coupled to receive police routing information relating to a plurality of multicast routes, the policy routing information providing default routing information for each of the plurality of multicast routes when no more-specific routing information is available;
route maintenance logic operably coupled to maintain in the multicast routing information base a single policy route in place of the plurality of multicast routes, the policy route reflecting the policy routing information;
wherein the policy route comprises a source address and a prefix indicating a number of most-significant source address bits, the source address and the prefix together defining a source address range encompassing the plurality of multicast routes; and
wherein the policy route further comprises an indicator indicating whether the plurality of multicast routes are multicast routes that are not associated with a next hop device or multicast routes for which the next hop device can be determined from corresponding unicast routes.

28. A device comprising:
a multicast routing information base;
receiving logic operably coupled to receive policy routing information relating to a plurality of multicast routes, the policy routing information providing default routing information for each of the plurality of multicast routes when no more-specific routing information is available;
route maintenance logic operably coupled to maintain in the multicast routing information base a single policy route in place of the plurality of multicast routes, the policy route reflecting the policy routing information; and
wherein the receiving logic is operably coupled to receive a bootstrap message including the policy routing information.

29. A program product comprising a computer readable medium having embodied therein a computer program for maintaining multicast routes in a multicast routing information base, the computer program comprising:
receiving logic programed to receive policy routing information relating to a plurality of multicast routes, the policy routing information providing default routing information for each of the plurality of multicast routes when no more-specific routing information is available; and
route maintenance logic programmed to maintain in the multicast routing, information base a single policy route in place of the plurality of multicast routes, the policy route reflecting the policy routing information, and wherein said plurality of multicast routes are associated with respective source addresses, wherein said source addresses fall within a predetermined range of source address values.

30. The program product of claim 29, wherein the plurality of multicast routes are multicast routes that are not associated with a next hop device.

31. The program product of claim 29, wherein the plurality of multicast routes are multicast routes for which the next hop device can be determined from corresponding unicast routes distribution logic operable to distribute the policy route to at least one other multicast device in a multicast communication network; and wherein said distribution logic is operable to distribute the policy route to the at least one other multicast device in the multicast communication network by sending at least one bootstrap message including at least the policy route.

32. The program product of claim 29, wherein the predetermined range of source address values is defined by a source address and a prefix indicating a number of most-significant source address bits, the source address and the prefix together defining a string of bit values to be matched between said predetermined source address and said respective source addresses for said plurality of multicast routes.

33. The program product of claim 29, further comprising:
reverse path forwarding logic programmed to determine a next hop device for a source address.

34. The program product of claim 33, wherein the reverse path forwarding logic is programmed to find a most-specific multicast route for the source address, determine that said most-specific multicast route is a policy route, find a unicast route for the source address, and determine the next hop device according to the unicast route.

35. The program product of claim 33, wherein the reverse path forwarding logic is programmed to find a most-specific multicast route for the source address, determine that said most-specific multicast route is a policy route, and determine that there is no next hop device for the source address.

36. The program product claim of claim 29, further comprising forwarding logic programmed to receive a multicast packet having a source address, find a most-specific multicast route for the source address, determine that said most-specific multicast route is a policy route, find a unicast route for the source address, and forward the multicast packet according to the unicast route.

37. The program product of claim 29, further comprising forwarding logic programmed to receive a multicast packet having a source address, find a most-specific multicast route for the source address, determine that said most-specific multicast route is a policy route, and drop the multicast packet.

38. A program product comprising a computer readable medium having embodied therein a computer program for maintaining multicast routes in a multicast routing information base, the computer program comprising:

receiving logic programmed to receive policy routing information relating to a plurality of multicast routes, the policy routing information providing default routing information for each of the plurality of multicast routes when no more-specific routing information is available;

route maintenance logic programmed to maintain in the multicast routing information base a single policy route in place of the plurality of multicast routes, the policy route reflecting the policy routing information;

route distribution logic programmed to distribute the policy route to at least one other multicast device in the multicast communication network; and wherein the route distribution logic is programed to send a bootstrap message including at least the policy route.

39. The program product of claim 38, wherein the bootstrap message comprises:

a source address; and a prefix indicating a number of most-significant source address bits, the source address and the prefix together defining a source address range encompassing the plurality of multicast routes.

40. The program product of claim 39, wherein the bootstrap message further comprises:

an indicator indicating whether the plurality of multicast routes are multicast routes that are not associated with a next hop device or multicast routes for which the next hop device can be determined from corresponding unicast routes.

41. A program product comprising a computer readable medium having embodied therein a computer program for maintaining multicast routes in a multicast routing information base, the computer program comprising:

receiving logic programmed to receive policy routing information relating to a plurality of multicast routes, the policy routing information providing default routing information for each of the plurality of multicast routes when no more-specific routing information is available;

route maintenance logic programmed to maintain in the multicast routing information base a single policy route in place of the plurality of multicast routes, the policy route reflecting the policy routing information;

wherein the policy route comprises a source address and a prefix indicating a number of most-significant source address bits, the source address and the prefix together defining a source address range encompassing the plurality of multicast routes; and wherein the policy route further comprises an indicator indicating whether the plurality of multicast routes are multicast routes that are not associated with a next hop device or multicast routes for which the next hop device can be determined from corresponding unicast routes.

42. A program product comprising a computer readable medium having embodied therein a computer program for maintaining multicast routes in a multicast routing information base, the computer program comprising:

receiving logic programmed to receive policy routing information relating to a plurality of multicast routes, the policy routing information providing default routing information for each of the plurality of multicast routes when no more-specific routing information is available; and route maintenance logic programmed to maintain in the multicast routing information base a single policy route in place of the plurality of multicast routes, the policy route reflecting the policy routing information; and wherein the receiving logic is programmed to receive a bootstrap message including the policy routing information.

43. A method for delivering policy routing information in a communication system using a protocol message, comprising:

forming a policy address in said protocol message;

forming a first indicator in said protocol message, said first indicator indicating a number of significant address bits in the policy address, the policy address and the first indicator together defining an address range; and forming a second indicator in said protocol message, a said second indicator indicating whether the address range defined by the policy address and the first indicator is one of an accepted address range and a rejected address range.

44. The method of claim 43 further comprising transmitting said protocol message as a data signal over the communication system.

45. A method for creating a multicast routing entry in a multicast routing information base, comprising:

forming a policy address in said routing entry;

forming a first indicator in said routing entry, said first indicator indicating a number of significant address bits in the policy address, the policy address and the first indicator together defining an address range; and forming a second indicator in said routing entry, said second indicator indicating whether the address range defined by the policy address and the first indicator is one of an accepted address range and a rejected address range.

* * * * *

UNITED STATES PATENT AND TRADEMARK OFFICE
CERTIFICATE OF CORRECTION

PATENT NO. : 6,791,980 B1
DATED : September 14, 2004
INVENTOR(S) : Li

It is certified that error appears in the above-identified patent and that said Letters Patent is hereby corrected as shown below:

Column 3,
Line 24, delete "mostspecific" and insert -- most-specific --.

Column 10,
Line 25, delete "and".
Line 32, after "values" insert -- ; --.

Column 11,
Line 24, after "cation network" insert -- , --.

Column 12,
Line 22, after "receiving" delete ",".
Line 32, after "available;" delete "and".
Line 40, after "of source address value" insert -- ;distribution logic operable to distribute the policy route to at least one other multicast device in a multicast communication network; and wherein said distribution logic is operable to distribute the policy route to the at least one other multicast device in the multicast communication network by sending at least one bootstrap message including at least the policy route --.
Line 45, delete "wherein said distribution logic is operable to distribute the policy route to the at least one other multicast device in the multicast communication network by sending at least one bootstrap message including at least the policy route".

Column 13,
Line 31, after "route in place of the plurality of multicast routes" insert -- , --.

Column 14,
Line 36, delete "and".
Line 44, after "of source address values" insert -- ; distribution logic operable to distribute the policy route to at least one other multicast device in a multicast communication network; and wherein said distribution logic is operable to distribute the policy route to the at least one other multicast device in the multicast communication network by sending at least one bootstrap message including at least the policy route --.
Line 51, after "unicast routes" delete "distribution logic operable to distribute the policy route to at least one other multicast device in a multicast communication network; and wherein said distribution logic is operable to distribute the policy route to the at least one other multicast device in the multicast communication network by sending at least one bootstrap message including at least the policy route".

UNITED STATES PATENT AND TRADEMARK OFFICE
CERTIFICATE OF CORRECTION

PATENT NO. : 6,791,980 B1
DATED : September 14, 2004
INVENTOR(S) : Li

It is certified that error appears in the above-identified patent and that said Letters Patent is hereby corrected as shown below:

<u>Column 16,</u>
Line 45, after "forming a second indicator in said protocol message," delete "a".

Signed and Sealed this

Thirtieth Day of May, 2006

JON W. DUDAS
*Director of the United States Patent and Trademark Office*